Oct. 7, 1958 R. A. LONG 2,855,328
PROCESS FOR COATING METAL BASE WITH SILICON AND
HEATING TO FORM METAL-SILICON SURFACE LAYER
Original Filed July 24, 1951
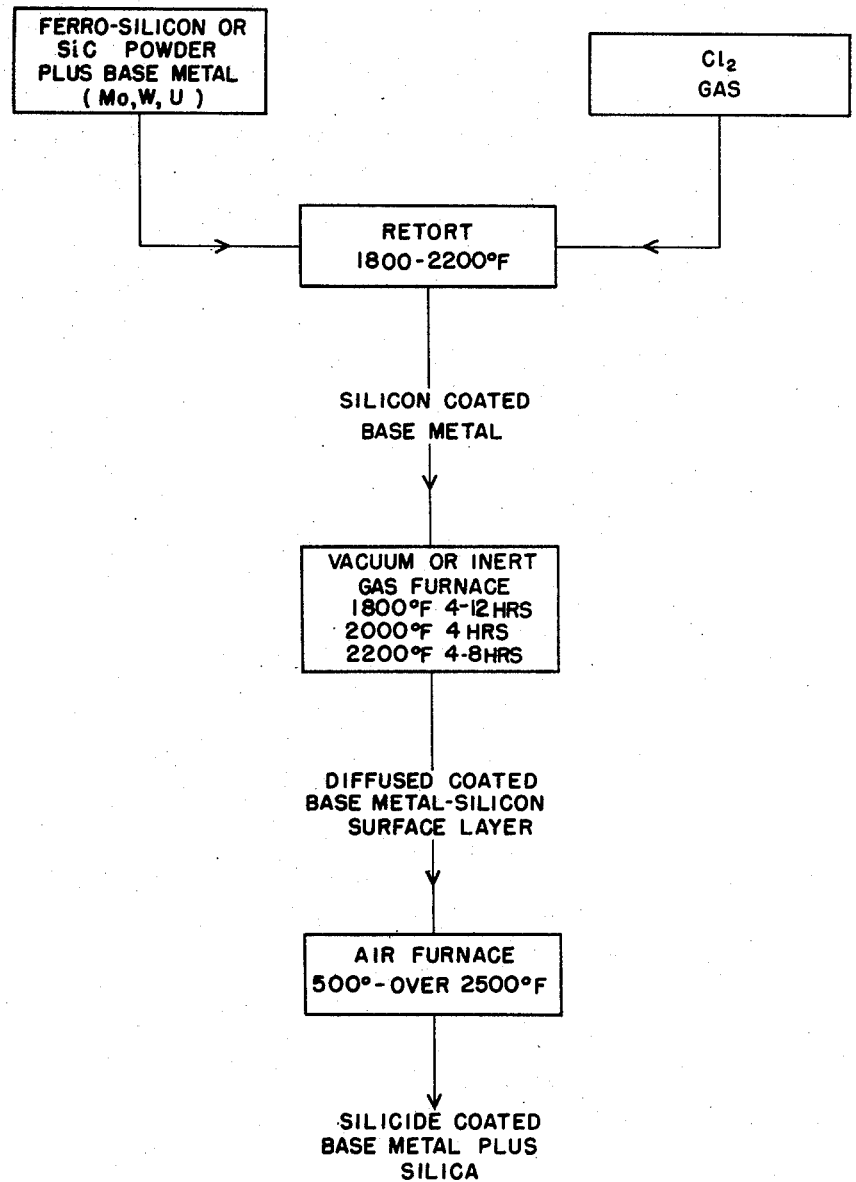
INVENTOR
ROGER A. LONG
BY R. J. Tompkins
ATTORNEYS

United States Patent Office 2,855,328
Patented Oct. 7, 1958

2,855,328

PROCESS FOR COATING METAL BASE WITH SILICON AND HEATING TO FORM METAL-SILICON SURFACE LAYER

Roger Alden Long, Bay Village, Ohio

Original application July 24, 1951, Serial No. 238,365. Divided and this application June 8, 1956, Serial No. 590,333

9 Claims. (Cl. 117—65)

(Granted under Title 35, U. S. Code (1952), sec. 266)

The invention described herein may be manufactured and used by or for the Government of the United States of America for governmental purposes without the payment of any royalties thereon or therefor.

This application is a division of my copending application Serial No. 238,365, filed July 24, 1951.

This invention relates to a ceramic coating for metals for high temperature uses.

In the usual methods of ceramic coating formation a liquid mixture of the coating oxides and a suspension vehicle is applied to the base metal and baked or fired to form a coating film. Difficulties inherent in these coatings are lack of adequate adhesive strength and resistance to high temperatures, resulting in fracture and chipping and, frequently, cleavage at the base coating boundary. Additional defects which frequently develop are lack of uniformity in spread and a tendency to porosity. Also the cost factor is often important.

One of the primary objects of the present invention is to provide a ceramic type coating which is highly resistant to breakage and cleavage. An object also is to provide a ceramic type coating which effectively resists fracture due to high temperature.

Additional objects include provision of process means which will secure an even coat, which will eliminate porosity, which will secure substantial reduction in manufacturing costs, and which will permit application to readily oxidizable base metals.

The process has been found applicable to various base metals such as molybdenum, tungsten, uranium, titanium carbide and the like but for purpose of brevity will be described as applied to molybdenum. Also the coating metals may include aluminum, beryllium, zirconium, silicon and chromium, but the illustrative process will be limited to silicon.

Molybdenum metal, in the fabricated form desired for coating, is packed in a retort with ferro-silicon or silicon carbide in powdered form, and the entire retort heated to 1800–2200° F. while chlorine gas is passed through the retort. The chlorine acts as a catalyst causing dissociation of the ferro-silicon or silicon carbide and the evolution of gaseous silicon chloride (probably $SiCl_4$) and this gas, on coming in contact with the hot molybdenum surface, decomposes into silicon and chlorine. Thereupon, the silicon diffuses into the molybdenum surface forming an intimate highly bonded surface layer. The amount of silicon thus deposited on the molybdenum surface depends upon the duration of the heating step and the quantity of silicon compound available for dissociation.

The time of retort heating in the chlorine atmosphere is dependent, in part, on the desired thickness of the silicon coating on the molybdenum, which should be limited to about one and a half thousandths inch (0.0015″). The temperature of the reaction also determines the heating time, the higher the temperature the shorter the time.

The second phase of the process involves formation of a silicide of molybdenum accompanied by further diffusion of silicon into the molybdenum surface. The silicon coated molybdenum is removed from the retort and placed either in a vacuum furnace, or a furnace supplied with an inert atmosphere, and heated to a temperature of from 1800° F. to 2400° F., the rate of silicon diffusion increasing with the temperature. At these higher temperatures a surface layer of silicide of the base metal forms, X-ray diffraction tests indicating the disilicide of molybdenum, at least fifty percent of the surface silicon being thus converted.

The following time schedule for the furnace heating has been found satisfactory:

| Temperature: | Time, hours |
|---|---|
| 1800° F | 4–12 |
| 2000° F | 4 |
| 2200° F | 4–8 |

The above schedule is also dependent on the recrystallization properties of the base molybdenum metal.

The third phase involves heating the coated metal in air, this bringing about an oxidation of silicon ($SiO_2$) not previously compounded with molybdenum or diffused therein. A temperature in excess of 500° F. is employed, preferably above 2500° F. to obtain silica in amorphous form. The length of applied heat is not important provided the proper conversion to silica is obtained. This third plase may not be necessary if the surface conversion to a silicide is substantially complete.

Reviewing the process it will now appear that by the three phase treatment there is secured a base metal of molybdenum with a highly refractory coat of molybdenum disilicide and silicon dioxide and adhesion brought about by diffusion of the coating metal (silicon) into the body of base metal. Thus adhesion of extreme strength is obtained between the refractory protective layer and the base metal. In addition the coating layer is found to be even and of reduced porosity and the whole process involves a simple step-by-step procedure.

One phase of the invention is of considerable importance which is that the diffusion step is carried out below the eutectic temperature of the component metals. Because of this there is no layer or "cast type" formation of a silicide with a pronounced cleavage surface between the base metal and the layer, and a lower fusion temperature than that of the component metals. Also, it is important to observe that the silicide is formed in a vacuum or an inert atmosphere at temperatures permitting continued diffusion of the silicon while at the same time developing a surface layer of a silicide of the base metal. Thus, the third step oxidation affects only a small amount of remaining free surface silicon.

It is of interest to note that the ceramic type coating of molybdenum made as above described will withstand temperatures as high as 2800° F. for as long as 1000 hours; and for shorter periods as high as 3000° F. Tests on aluminum-molybdenum coatings show a temperature resistance of 3300° F. to 3500° F. for five minutes.

Modifications of the invention other than stated may of course be made, the scope of the invention being circumscribed only by the claims as hereto appended.

What is claimed is:

1. The process of coating fabricated molybdenum with silicon compounds which comprises packing the molybdenum in a retort with powdered silicon carbide, heating the retort to a temperature between 1800° F. and 2200° F. in a moving atmosphere of chlorine for a time period sufficient to decompose the carbide and produce silicon diffusion in the surface molybdenum, removing the silicon-coated molybdenum from the retort, and heating the silicon-coated molybdenum in a furnace having an inert or vacuous atmosphere to a temperature between 1800°

F. and 2400° F. and holding the silicon-coated molybdenum in said temperature range until over fifty percent of the surface silicon is converted into a silicide of molybdenum.

2. The process of coating fabricated molybdenum with silicon compounds which comprises packing the molybdenum in a retort with powdered silicon carbide, heating the retort to a temperature between 1800° F. and 2200° F. in a moving atmosphere of chlorine for a time period sufficient to decompose the carbide and produce silicon diffusion in the surface molybdenum, removing the silicon-coated molybdenum from the retort, heating the silicon-coated molybdenum in a furnace having an inert or vacuous atmosphere to a temperature between 1800° F. and 2400° F., holding the silicon-coated molybdenum in said temperature range until over fifty percent of the surface silicon is converted into a silicide, and controllably reheating the coated molybdenum in air to oxidize remaining surface silicon.

3. The process of coating fabricated molybdenum with silicon compounds which comprises packing the molybdenum in a retort with powdered ferro-silicon, heating the retort to a temperature between 1800° F. and 2200° F. in a moving atmosphere of chlorine for a time period sufficient to decompose the ferro-silicon and produce silicon diffusion in the surface molybdenum, removing the silicon-coated molybdenum from the retort, and heating the silicon-coated molybdenum in a furnace having an inert or vacuous atmosphere to a temperature between 1800° F. and 2400° F. and holding the silicon-coated molybdenum in said temperature range for a time period between twelve and twenty-four hours until over fifty percent of the surface silicon is converted into a silicide of molybdenum.

4. The process of coating fabricated molybdenum with silicon compounds which comprises packing the molybdenum in a retort with powdered ferro-silicon, heating the retort to a temperature between 1800° F. and 2200° F. in a moving atmosphere of chlorine for a time period sufficient to decompose the ferro-silicon and produce silicon diffusion in the surface molybdenum, removing the silicon-coated molybdenum from the retort, heating the silicon-coated molybdenum in a furnace having an inert or vacuous atmosphere to a temperature between 1800° F. and 2400° F. and holding the silicon-coated molybdenum in said temperature range for a time period between twelve and twenty-four hours until over fifty percent of the surface silicon is converted into a silicide of molybdenum, and controllably finally reheating the coated molybdenum in air to oxidize remaining surface silicon.

5. The process of coating fabricated molybdenum with silicon compounds which comprises packing the molybdenum in a retort with a powder selected from the group consisting of silicon carbide and ferro-silicon, heating the retort to a temperature at or above 1800° F. but below the eutectic formation temperature of molybdenum and silicon in an atmosphere of chlorine for a time period sufficient to free the silicon and bring about diffusion thereof in the molybdenum from the retort, reheating the silicon-coated molybdenum to a temperature at or above 1800° F. but below the eutectic formation temperature of molybdeum and silicon in a vacuous or inert atmosphere, and holding the molybdenum at said temperature until over fifty percent of the surface silicon is converted into a silicide.

6. The process according to claim 5 with the added step of controllably reheating the coated molybdenum after the prior two heats, in open air, to bring about oxidation of remaining free surface silicon.

7. The process of coating a fabricated base metal which process comprises surrounding a base metal selected from the group consisting of molybdenum, tungsten and uranium with a powder pack of a finely ground compound from the group consisting of silicon carbide and ferro-silicon, heating said base metal and powder pack in the presence of chlorine gas at a temperature below the melting point of silicon for a time period sufficient to free elemental silicon and produce diffusion of said elemental silicon in the surface of said base metal, reheating the silicon-coated base metal to a temperature below the melting point of silicon in a vacuous or inert atmosphere for sufficient time to convert said elemental surface silicon into a silicide of the base metal.

8. The process of coating a fabricated base metal which process comprises surrounding a base metal selected from the group consisting of molybdenum, tungsten and uranium with a powder pack of a finely ground compound from the group consisting of silicon carbide and ferro-silicon, heating said base metal and powder pack in the presence of chlorine gas at a temperature below the melting point of silicon for a time period sufficient to free elemental silicon and produce diffusion of said elemental silicon in the surface of said base metal, reheating the silicon-coated base metal to a temperature below the melting point of silicon in a vacuous or inert atmosphere for sufficient time to convert over fifty percent of said elemental surface silicon into a silicide of the base metal, and further controllably reheating the coated base metal in open air at a temperature in excess of 500° F. to oxidize any remaining elemental surface silicon to crystalline silica.

9. The process of coating a fabricated base metal which process comprises surrounding a base metal selected from the group consisting of molybdenum, tungsten and uranium with a powder pack of finely ground compound from the group consisting of silicon carbide and ferro-silicon, heating said base metal and powder pack in the presence of chlorine gas at a temperature below the melting point of silicon for a time period sufficient to free elemental silicon and produce diffusion of said elemental silicon in the surface of said base metal, reheating the silicon-coated base metal to a temperature below the melting point of silicon in a vacuous or inert atmosphere for sufficient time to convert over fifty percent of said elemental surface silicon into a silicide of the base metal, and further controllably reheating the coated base metal in open air at a temperature in excess of 2500° F. to oxidize any remaining elemental surface silicon to amorphous silica.

References Cited in the file of this patent

UNITED STATES PATENTS

| | | |
|---|---|---|
| 1,853,370 | Marshall | Apr. 12, 1932 |
| 2,612,442 | Goetzel | Sept. 30, 1952 |
| 2,665,475 | Campbell | Jan. 12, 1954 |
| 2,690,409 | Wainer | Sept. 28, 1954 |